United States Patent
Iida et al.

(10) Patent No.: US 8,219,453 B1
(45) Date of Patent: Jul. 10, 2012

(54) GENERATING CLASSIFICATIONS FROM NORMALIZED ITEM ATTRIBUTES

(75) Inventors: Akiyoshi D. Iida, Las Vegas, NV (US); David B. Bailey, Truckee, CA (US); Jonathan R. Jacobs, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 12/856,178

(22) Filed: Aug. 13, 2010

(51) Int. Cl.
*G06Q 30/00* (2006.01)
(52) U.S. Cl. ...................................................... 705/26.1
(58) Field of Classification Search .................. 705/26.1
See application file for complete search history.

(56) References Cited

U.S. PATENT DOCUMENTS

| | | | | |
|---|---|---|---|---|
| 2008/0134100 A1* | 6/2008 | Ferrari et al. | ............... | 715/854 |
| 2010/0079464 A1* | 4/2010 | Matsumura | ............... | 345/440 |

OTHER PUBLICATIONS

U.S. Appl. No. 12/856,128, filed Aug. 13, 2010 for "Item Search Using Normalized Item Attributes".
U.S. Appl. No. 12/856,164, filed Aug. 13, 2010 for "Normalized Item Attributes".

* cited by examiner

*Primary Examiner* — Mila Airapetian
(74) *Attorney, Agent, or Firm* — Thomas, Kayden, Horstemeyer & Risley, LLP

(57) ABSTRACT

Disclosed are various embodiments for generating classifications for items from normalized item attributes. Multiple attribute options are maintained for an item. Each of the attribute options is associated with a respective range of values on a normalized scale for an attribute. Multiple item classifications are generated for one of the attribute options by mapping the respective range of values for the one of the attribute options to one or more item classifications on each of multiple scales of classification for the attribute.

20 Claims, 9 Drawing Sheets

| 203 → | 800 | 825 | 850 | 875 | 900 | 925 | 950 | 975 | 1000 |
|---|---|---|---|---|---|---|---|---|---|
| US Men's | | 8.5 | | 9 | | 9.5 | | 10 | |
| US Women's | | 9.5 | | 10 | | 10.5 | | 11 | |
| EU Men's | | 41 | | 42 | | | | 43 | |
| ACME Men's | 8 | | 8.5 | | 9 | | 9.5 | | 10 |

GENERATING CLASSIFICATIONS FROM NORMALIZED ITEM ATTRIBUTES

CROSS REFERENCE TO RELATED APPLICATIONS

The following application is related to co-pending U.S. patent application entitled "NORMALIZED ITEM ATTRIBUTES" filed on Aug. 13, 2010 and assigned patent application Ser. No. 12/856,164, and to co-pending U.S. Patent Application entitled "ITEM SEARCH USING NORMALIZED ITEM ATTRIBUTES" filed on Aug. 13, 2010 and assigned patent application Ser. No. 12/856,128, which are incorporated herein by reference in their entirety.

BACKGROUND

Products offered for sale by online merchants may have a variety of attributes. For example, a certain style of shoe may be offered in multiple sizes and widths. Thus, each combination of size and width for the shoe style may correspond to a distinct inventory item for a merchant. Some products, such as, for example, handbags, may be offered in only a single size and may correspond to a single inventory item.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to providing data structures and applications that employ normalized attributes for items. As used herein, the term "item" refers to any good, product, service, software item, multimedia item, or other item that may be offered for sale, purchase, rental, lease, download, and any other form of consumption as can be appreciated. Applications are described that, for example, generate classifications of items from normalized item attributes, facilitate searching for items based on normalized item attributes, enable efficient storage of item attribute data in a relational data store, and so on. Various embodiments described herein recognize that the types of attributes associated with an item may vary based on the item. Further, various embodiments described herein recognize that a type of attribute may be described according to a number of different scales of measurement or classification of an item characteristic. Therefore, normalized scales are employed for each attribute type. In the following discussion, a general description of the system and its components is provided, followed by a discussion of the operation of the same.

Figure 1:
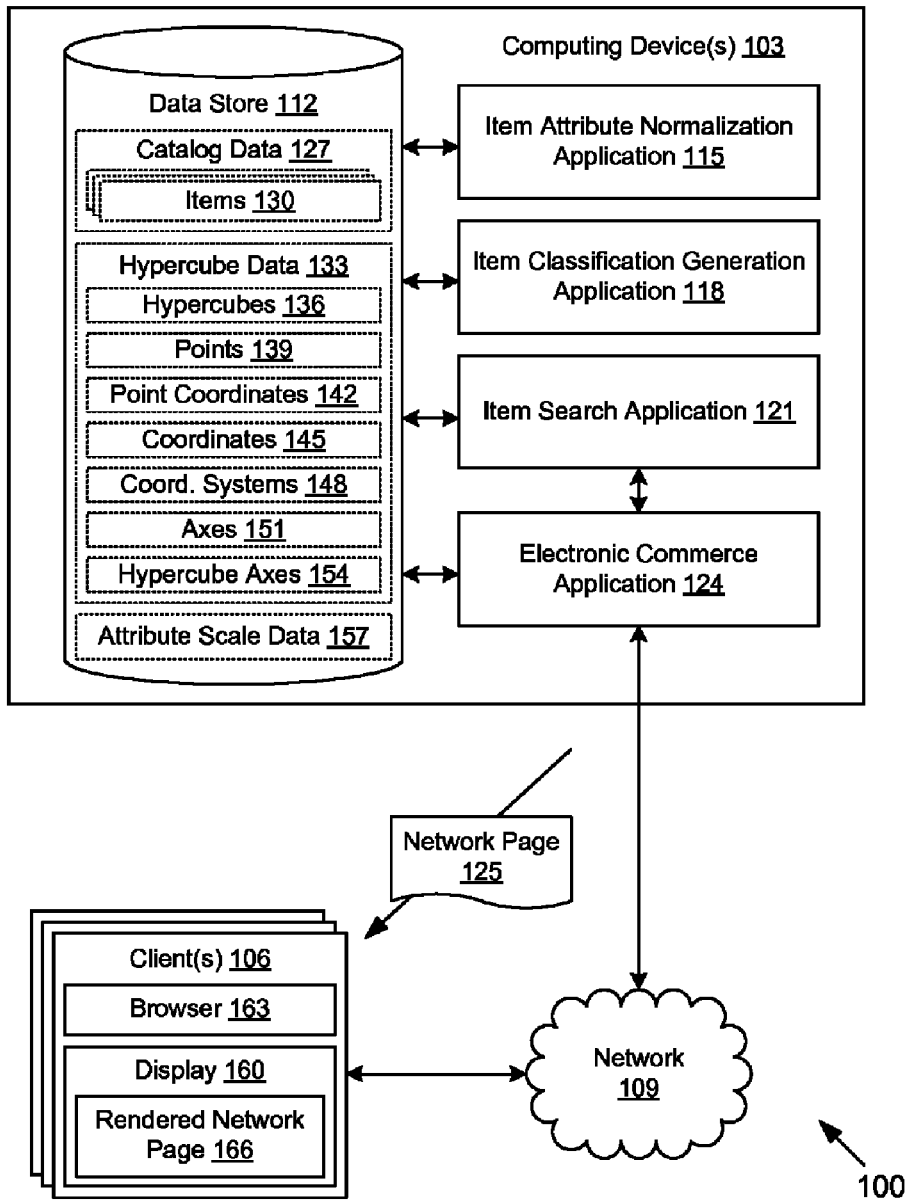
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores 112 as can be appreciated. The data stored in the data store 112, for example, is associated with the operation of the various applications and/or functional entities described below. In one embodiment, the data store 112 comprises a relational database management system that may be accessed using structured query language (SQL). In other embodiments, the data store 112 may comprise file-based databases, comma-delimited files, key-value storage systems, and other types of data storage.

The components executed on the computing device 103, for example, include an item attribute normalization application 115, an item classification generation application 118, an item search application 121, an electronic commerce application 124, and other applications, services, processes, systems, engines, or functionality not discussed in detail herein. The item attribute normalization application 115 is executed to perform mapping of an option associated with an attribute to and/or from a range of values on a normalized scale for the attribute. The item classification generation application 118 is executed to generate various classifications for attribute options associated with an item according to multiple scales of classification. As non-limiting examples, such classifications may be rendered in charts, tables, drop-down boxes, or other data presentation formats.

The item search application 121 is executed to facilitate searching for items in a catalog of items based at least in part on one or more attributes associated with a representative item. The item search application 121 is configured to utilize ranges of values on normalized scales for the attributes in making comparisons with items in the catalog of items. The electronic commerce application 124 is executed to facilitate the online merchandising and purchase of items over the network 109. The electronic commerce application 124 also performs various backend functions associated with the online presence of a merchant in order to facilitate the online merchandising and purchase of items as will be described.

As a non-limiting example, the electronic commerce application 124 generates network pages 125, such as web pages or other types of network content, that are provided to clients 106 for the purposes of selecting items for purchase, rental, download, lease, or other form of consumption as will be described. As other non-limiting examples, the electronic commerce application 124 may be configured to generate text messages, email messages, banner advertisements, social networking communications, and other forms of communication over the network 109. In one embodiment, the electronic commerce application 124 may serve up content for a network site facilitating a shopping comparison feature among multiple merchants. In another embodiment, the electronic commerce application 124 may serve up content for a network site featuring an electronic marketplace for one or more merchants.

The data stored in the data store 112 includes, for example, catalog data 127 including items 130; hypercube data 133 including hypercubes 136, points 139, point coordinates 142, coordinates 145, coordinate systems 148, axes 151, hypercube axes 154; attribute scale data 157; and potentially other data. The catalog data 127 includes data supporting a catalog of items 130 that may be offered through, or otherwise described by, a network site associated with one or more merchants. Items 130 may include any data relating to items 130 offered for sale or other consumption through the electronic commerce application 124. Such data may include, for example, title, price, description, shipping classifications, weight, reviews, ratings, specifications, quantities in inventory, unique identifiers, options, colors, styles, and/or other data.

Hypercube data 133 includes data that facilitates the association of attributes and attribute options with items 130. Hypercubes 136 may be employed for this purpose. A hypercube 136 may be thought of as an N-dimensional analog to a square, and is used herein for logically structuring the associations of N-types of attributes and their corresponding attribute options with items 130. A hypercube 136 may have any number of hypercube axes 154, which correspond to attributes of items 130. As non-limiting examples, an attribute related to a hypercube axis 154 may correspond to size, width, standard measurements, collar length, shoulder slope, sleeve opening, waist size, and/or other attributes related to types of items 130 such as, for example, footwear, apparel, and other categories. Because hypercubes 136 can vary among items 130, it may not be necessary to maintain data storage in the data store 112 for certain attributes such as, for example, size, width, etc. for each of the items 130 when the attributes are not applicable to all items 130.

In various embodiments, a hypercube axis 154 may be mapped to an axis 151 that may be used by multiple hypercubes 136. The axis 151 is measured along a normalized scale for the respective attribute. An axis 151 may be associated with a coordinate system 148 that relates to how the values of the axis 151 are divided into attribute options or values on a scale of classification of items 130. A coordinate system 148 for an attribute may have a specific type of unit that differs from a unit employed in another coordinate system 148 for the same attribute.

A point 139 refers to a point on a hypercube 136, which corresponds to a set of point coordinates 142 on one or more axes 151. The set of point coordinates 142 for a point 139 may map to one or more coordinates 145. In various embodiments, a coordinate 145 may be employed in multiple hypercubes 136. Where there are multiple versions of an item 130 defined by the options assigned to the attributes of the item, a point 139 corresponds to a distinct one of the versions of the item 130. As such, a point 139 may be associated with a unique stock identifier for the version of the item 130 in various embodiments. Similarly, each coordinate 145 may be associated with a respective disjoint set of unique stock identifiers.

Each coordinate 145 may describe a specific option available for an attribute. As a non-limiting example, where an attribute is shoe size, a coordinate 145 may describe a size 10 in a coordinate system 148 of United States men's shoe sizes. As another non-limiting example, where an attribute is shoe width, a coordinate 145 may describe a medium width in a coordinate system 148 of United States shoe widths. As another non-limiting example, where an attribute is shirt size, a coordinate 145 may describe an extra-large size in a coordinate system 148 specific to one apparel manufacturer. Attribute scale data 157 includes various data relating to the scales of measurement or classification that are natively associated with the items 130.

Each of the coordinates 145 may define a range of values on the normalized scale corresponding to the respective axis 151 for the attribute. In one embodiment, the range of values is defined by a minimum value and a maximum value. In another embodiment, the range of values is defined by a minimum value and a normalized measurement. The values on the normalized scale may be arbitrary with respect to the values on the scales of classification from which they are derived. However, the values on the normalized scale are selected for proper comparison of a value on one scale versus a value on another scale for the same attribute. A non-limiting example of how a range of values on a normalized scale is selected will next be discussed.

Figures 2, 3:
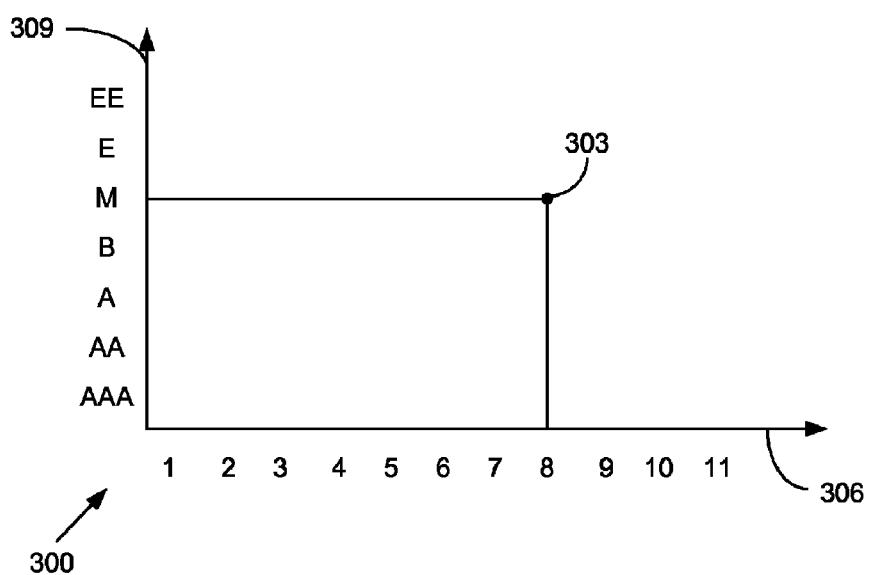
FIG. 2 is a diagram showing the relationships of various scales of measurement to a normalized scale as employed by applications executed in a computing device in the networked environment of FIG. 1 according to various embodiments of the present disclosure.
FIG. 3 is a diagram illustrating one view of a hypercube point as employed by applications executed in a computing device in the networked environment of FIG. 1 according to various embodiments of the present disclosure.

Turning now to FIG. 2, shown is a diagram 200 illustrating the relationships of various scales of measurement or classification to a normalized scale 203 as employed by applications executed in a computing device 103 (FIG. 1) in the networked environment 100 (FIG. 1) according to various embodiments. In particular, the diagram 200 relates to four example scales of measurement for footwear size: the U.S. Men's scale 206, the U.S. Women's scale 209, the E.U. Men's scale 212, and the ACME Men's scale 215. While each of the scales 206, 209, and 212 correspond to a geographic area in which the scale is customarily used, such as the United States or the European Union, the scale 215 corresponds to a scale employed by a hypothetical manufacturer of footwear. Various manufacturers, lines of merchandise, brands, etc. may employ specific scales of measurement or item classification for various attributes of items 130. Although four scales 206, 209, 212, and 215 are depicted in the diagram 200, this hypothetical example is not intended to be limiting, and there may be any number of scales of measurement for a footwear size attribute.

The normalized scale 203 in this example runs from 800 to 1000. In some embodiments, such normalized values may be arbitrary and may be used only for comparison of the scales 206, 209, 212, and 215. In other embodiments, the normalized values may correspond to physical measurements according to a standardized system of measurement, such as, for example, the metric system or other systems. While the values in diagram 200 are provided as integers, floating point values may be used if desired in some embodiments.

For example, in diagram 200, the denomination of 9 on the scale 206 corresponds to a range of values from 850 to 900 on the normalized scale 203, while the denomination of 10 on the scale 209 corresponds to the same range of values. By contrast, no denomination on the scale 212 corresponds to the exact range of values of 850 to 900 on the normalized scale 203. The denomination 42 on the scale 212 ranges from values 825 to 925, so the denomination 42 does overlap and include the denomination of 9 on the scale 206 and the denomination of 10 on the scale 209. However, unlike the denomination of 42 on the scale 215, no denomination on the scale 215 appears to clearly correspond to the denomination 9 on the scale 206 or the denomination 10 on the scale 10. It may be said, for example, that the ACME Men's size 8.5 may correspond to a U.S. Men's size 9 that fits small or a U.S. Men's size 8.5 that fits large.

Whether an attribute option given according to one scale of measurement may be converted to an attribute option given according to another scale of measurement may be configured according to various parameters. As an example, it may be configured that the two ranges are to overlap by a threshold or that one range fall within another for a match. As another example, a greatest overlap of one range compared to another may be used for matching. As yet another example, an inclusion of one range nearest the center of another range may be used for matching attribute options.

Referring next to FIG. 3, shown is a diagram 300 illustrating one view of a point 303 on a hypercube 136 (FIG. 1) for footwear as employed by applications executed in a computing device 103 (FIG. 1) in the networked environment 100 (FIG. 1) according to various embodiments. The point 303, which corresponds to a point 139 (FIG. 1), is a point of intersection of coordinates 145 (FIG. 1) on two axes 151 (FIG. 1). A footwear size axis 306 and a footwear width axis 309 are provided in this non-limiting example.

The point 303 corresponds to a coordinate 145 on the footwear size axis 306 of "8" and a coordinate 145 on the footwear width axis of "M." In other words, the point 303 corresponds to a combination of attributes "8 medium," which may correspond to a distinct version of a footwear item 130 (FIG. 1). Although any combination of coordinates 145 may be envisioned on the diagram 300, it may often be the case that only a few points 139 are actually available in an inventory. For example, it may be the case that the width "EE" is not available for the footwear size "1" for a given footwear item 130. Thus, in one embodiment, only available points 139 for an item 130 are associated with the item 130.

Referring back to FIG. 1, the client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, smart phones, set-top boxes, music players, web pads, tablet computer systems, game consoles, electronic book readers, or other devices with like capability. The client 106 may include a display 160. The display 160 may comprise, for example, one or more devices such as cathode ray tubes (CRTs), liquid crystal display (LCD) screens, gas plasma-based flat panel displays, LCD projectors, or other types of display devices, etc.

The client 106 may be configured to execute various applications such as a browser 163 and/or other applications. The browser 163 may be executed in a client 106, for example, to access and render network pages, such as web pages, or other network content served up by the computing device 103 and/or other servers, thereby generating a rendered network page 166 on the display 160. The client 106 may be configured to execute applications beyond browser 163 such as, for example, email applications, instant message applications, and/or other applications.

Next, a general description of the operation of the various components of the networked environment 100 is provided. To begin, a catalog of items 130 is provided and maintained in the data store 112. Existing catalog data 127 may be imported or updated so as to employ the hypercube data 133 representation of attributes. The item attribute normalization application 115 may be used to maintain, access, and transform the data structures associated with the hypercube data 133 and the attribute scale data 157. To this end, the item attribute normalization application 115 may compute normalized values for attribute options associated with an item 130 and/or translate normalize values to classifications on various scales of measurement for the attributes. The operation of portions of the item attribute normalization application 115 will be further described in connection with the flowchart of FIG. 7.

A user at a client 106 in the networked environment 100 may, for example, browse a network site served up by the electronic commerce application 124. Detail network pages 125 for specific items 130 may be sent to the client 106 over the network 109 for presentation as a rendered network page 166 on the display 160. Where an item 130 is associated with one or more attributes that have multiple attribute options, the electronic commerce application 124 may be configured to include a diagram, chart, table, drop-down box, or other data presentation element populated with the various options available for the attribute. To this end, the item classification generation application 118 may be configured to generate the diagram, chart, table, drop-down box, etc.

Although some types of items 130 may have attributes associated only with one scale of classification, other types of items 130 may have attributes associated with multiple scales of classification. For example, an item 130 may be associated with a coordinate 145 having a range of values on a normalized scale according to a value on a native scale of classification for the item 130. The item classification generation application 118 may be configured to translate the range of values on the normalized scale into values on other scales of classification beyond the native scale of classification. As a non-limiting example, the item classification generation application 118 may be configured to translate a footwear size provided originally according to the U.S. Men's scale into a size according to the U.S. Women's scale, the E.U. Men's scale, a unisex scale, a manufacturer specific scale, and/or another scale. The operation of portions of the item classification generation application 118 will be further described in connection with the flowchart of FIG. 8.

A user at the client 106 may also request a network page 125 that includes search functionality provided by the item search application 121. The item search application 121 may enable the user to search for items 130 that are similar to a reference item 130 based at least in part on one or more attribute options associated with the reference item 130. The reference item 130 may be an item 130 previously ordered by the user or merely an item 130 in the catalog that has been indicated or selected by the user. In one embodiment, the item search application 121 is automatically driven to deliver recommendations of similar items 130 to the user based at least in part on items 130 previously ordered or viewed by the user. Such recommendations may be included within a network page 125, email, text message, banner advertisement, social networking communication, or provided by another form of communication.

The similar items 130 may be identified from the range(s) of values associated with the target attribute options of the representative item 130. Compared with the reference range of values, the ranges of values associated with the similar items 130 may be identical to the reference range, may be included in the reference range, may overlap the reference range by at least a threshold amount, or may be identified as matching the reference range in some other respect. The operation of portions of the item search application 121 will be further described in connection with the flowchart of FIG. 9.

Figure 4:
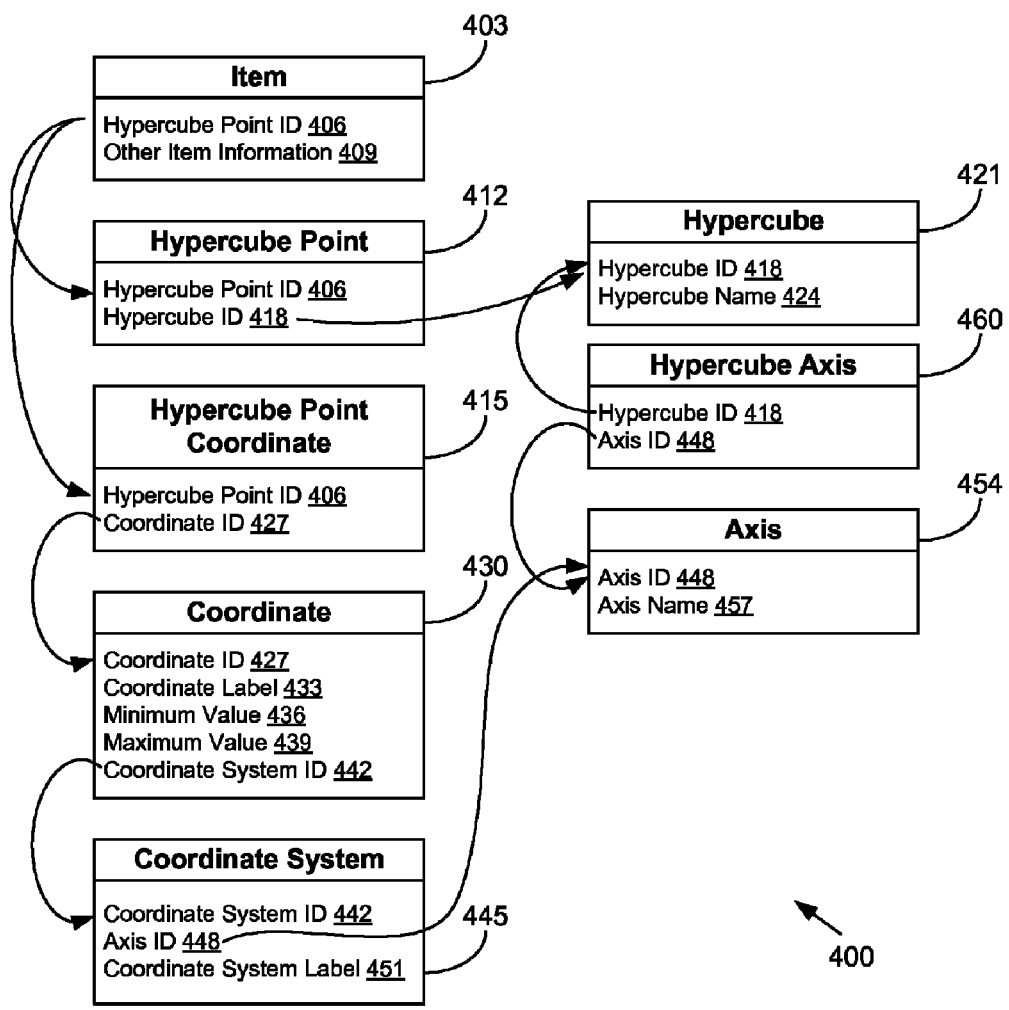
FIG. 4 is a diagram illustrating the relationships of various data structures employed by applications executed in a computing device in the networked environment of FIG. 1 according to various embodiments of the present disclosure.

Referring next to FIG. 4, shown is a diagram illustrating the relationships of various data structures employed by applications executed in a computing device 103 (FIG. 1) in the networked environment 100 (FIG. 1) according to various embodiments. Specifically, FIG. 4 illustrates an example schema 400 that may be used to structure the hypercube data 133 (FIG. 1). Each block in the schema 400 may correspond to a table or view in a relational data store 112 (FIG. 1). It is understood that the schema 400 is merely an example and is not intended to be limiting. In other embodiments, the schema 400 may be structured differently, with different tables, different columns in the tables, and so on.

To begin, an item table 403 is provided that corresponds to an item 130 (FIG. 1). Stored in the item table 403 may be a hypercube point identifier 406 and other item information 409 such as, for example, stock identifiers, style information, color information, title, description, price, etc. The hypercube point identifier 406 identifies a hypercube point 139 (FIG. 1) that is associated with a specific version of an item 130 having one or more attribute options for one or more attributes. To this end, the hypercube point identifier 406 may refer to a row in a hypercube point table 412 and to one or more rows in a hypercube point coordinate table 415.

The hypercube point table 412 may include, for example, a hypercube point identifier 406, a hypercube identifier 418, and/or other columns. The hypercube identifier 418 identifies a row in a hypercube table 421 that corresponds to a hypercube 136 (FIG. 1). The hypercube table 421 may include, for example, a hypercube identifier 418, a hypercube name 424, and/or other columns. The hypercube name 424 may correspond to a type of item 130 that is associated with the particular hypercube 136, e.g., "Footwear."

The hypercube point coordinate table 415, which may correspond to the point coordinates 142 (FIG. 1), may include, for example, a hypercube point identifier 406, a coordinate identifier 427, and/or other columns. Depending on how many attributes are associated with the hypercube 136, multiple rows may be provided in the hypercube point coordinate table 415 having the same hypercube point identifier 406 but different coordinate identifiers 427. The coordinate identifier 427 may refer to a row in the coordinate table 430 corresponding to a coordinate 145.

The coordinate table 430 may include, for example, a coordinate identifier 427, a coordinate label 433, a minimum value 436, a maximum value 439, a coordinate system identifier 442, and/or other columns. The coordinate label 433 comprises a textual identifier of a coordinate 145 corresponding to an option for an attribute, such as, for example, "size 9." The minimum value 436 and the maximum value 439 specify a range of values that corresponds to the attribute option on a normalized scale for the attribute. The coordinate system identifier 442 may refer to a row in the coordinate system table 445.

The coordinate system table 445, which may correspond to the coordinate systems 148 (FIG. 1), may include, for example, a coordinate system identifier 442, an axis identifier 448, a coordinate system label 451, and/or other columns. The axis identifier 448 identifies a row in an axis table 454 that corresponds to an axis 151 (FIG. 1). The coordinate system label 451 comprises a textual identifier of a coordinate system 148 such as, for example, "U.S. Men's Footwear Sizes." The axis table 454 may include, for example, an axis identifier 448, an axis name 457, and/or other columns. The axis name 457 comprises a textual identifier of an axis 151 such as, for example, "size." It is noted that multiple rows in the coordinate system table 445 may refer to the same row in the axis table 454. In other words, multiple scales of measurement or classification of items 130 may be mapped to one type of attribute.

One or more rows in a hypercube axis table 460 may be linked to a row in the axis table 454. The hypercube axis table 460 may correspond to hypercube axes 154 (FIG. 1). The hypercube axis table 460 may include, for example, a hypercube identifier 418, an axis identifier 448, and/or other columns. Thus, the hypercube axis table 460 functions to link hypercubes 136 with axes 151, though axes 151 may be shared by multiple hypercubes 136.

Figure 5:
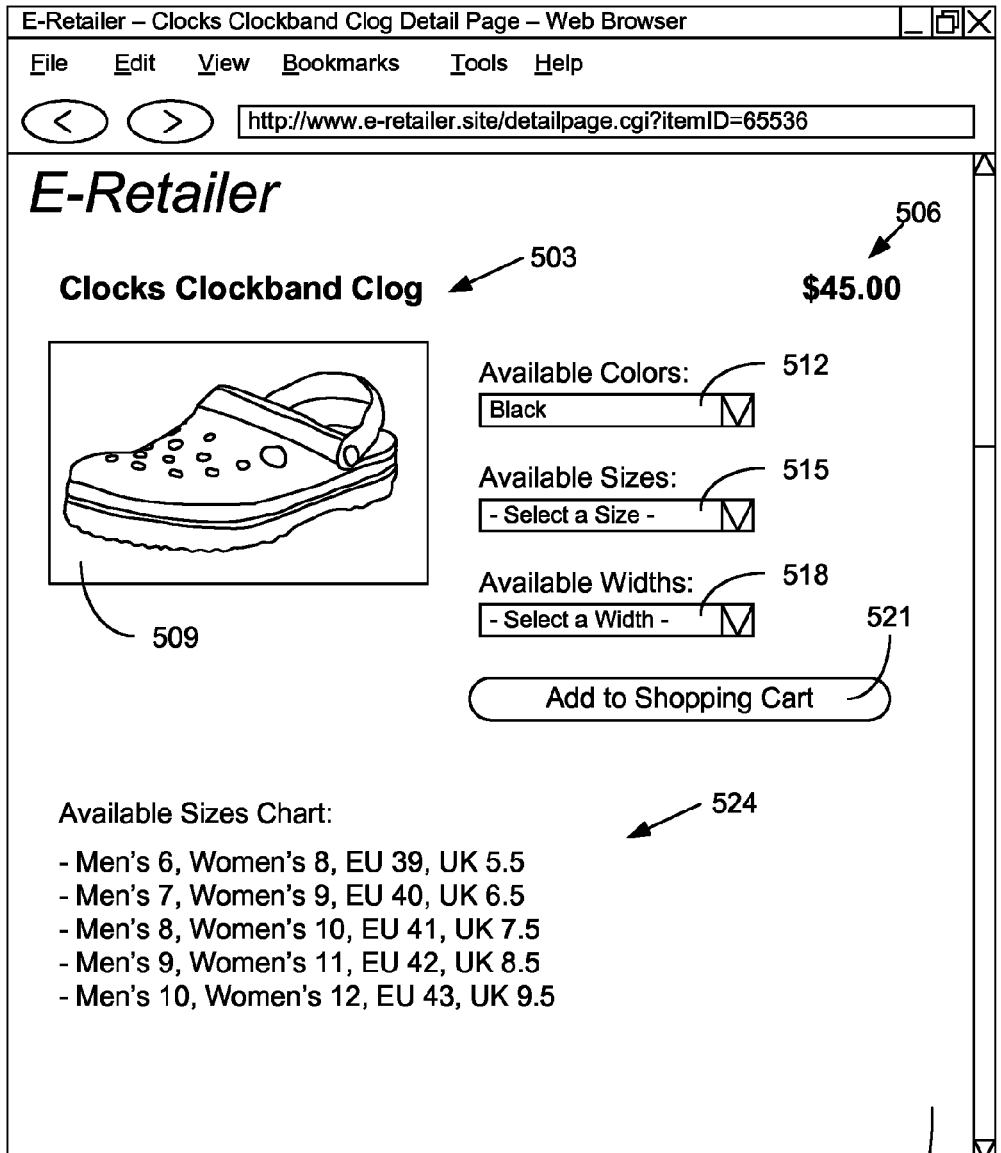
FIGS. 5 and 6 are drawings of examples of user interfaces rendered by a client in the networked environment of FIG. 1 according to various embodiments of the present disclosure.

Moving on to FIG. 5, shown is one example of a user interface 500 rendered by a browser 163 (FIG. 1) executed in a client 106 (FIG. 1) in the networked environment 100 (FIG. 1) according to various embodiments. Specifically, FIG. 5 depicts a rendered network page 166 generated at least in part by the item classification generation application 118 (FIG. 1) and corresponding to a detail network page 125 (FIG. 1) for an item 130 (FIG. 1). The rendered network page 166 includes an item title 503 of "Clocks Clockband Clog," an item price 506 of "$45.00," and an item image 509. Other information and multimedia may be included in other embodiments.

The rendered network page 166 also includes a color selection tool 512 for selecting available colors for the item 130, a size selection tool 515 for selecting available sizes for the item 130, a width selection tool 518 for selecting available widths for the item 130, and/or other tools in other embodiments. Although the color selection tool 512 is provided for selecting one of multiple colors for the item 130, it may be the case that color is not an attribute that is configured to be normalized. However, in some embodiments, it may be that color is an attribute that is associated with a normalized scale. A scale of classification may correspond to a variation in color in some embodiments. The variation in color may be across color component values in a color space such as, for example, the red/green/blue (RGB) color space, the hue/saturation/value (HSV) color space, or some other color space. The size selection tool 515 and the width selection tool 518 may be configured to select attribute option(s) for the attributes of size and width for the item 130, which corresponds to a shoe.

Such measurement options as, for example, shoe size and shoe width may be normalized by the item attribute normalization application 115. Depending on a preference of the user, a location of a user, and/or a default setting, the options in the size selection tool 515 and the width selection tool 518 may be populated by the item classification generation application 118 according to one or more scales of item classification for the respective attributes. As a non-limiting example, if the user is determined to be in Europe, the options in the size selection tool 515 and the width selection tool 518 may be populated by the item classification generation application 118 according to measurement scales customarily in use in Europe. In various embodiments, the color selection tool 512, the size selection tool 515, and the width selection tool 518 may be dynamic such that the selection of an option for an attribute such as color will remove the size and width options that are incompatible with the selected color based on versions of the item 130 in inventory, available hypercube points 139 (FIG. 1), and/or other factors. An item selection component 521 is provided to add the item 130 with the selected options to a list an/or initiate an order of the item 130 with the selected options.

An available sizes chart 524 may be provided. Such a chart may be included dynamically based on the location of the user, preferences of the user, and/or other factors. In one embodiment, the information shown in the available sizes chart 524 is included within the size selection tool 515. Other charts and data representations may be provided for available widths and/or other types of attributes associated with the given item 130. Although the original size scale for the item 130 may be, for example, "Men's," the item classification generation application 118 has translated the available sizes into other scales, such as "U.S. Women's," "EU," and "UK." The available sizes chart 524 consequently facilitates comparison of the available sizes by a user according to different scales that may be more familiar to the user.

Figure 6:
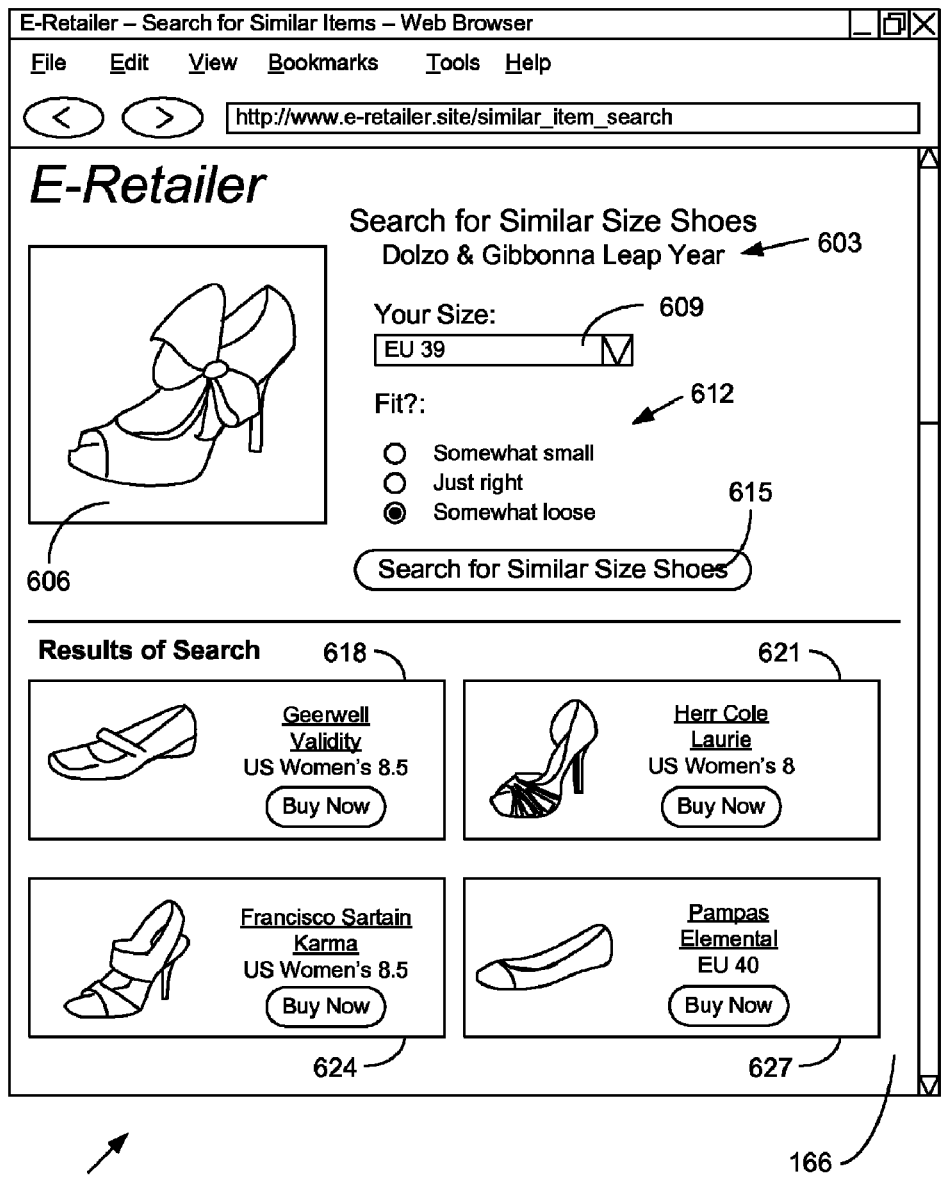

With reference to FIG. 6, shown is one example of a user interface 600 rendered by a browser 163 (FIG. 1) executed in a client 106 (FIG. 1) in the networked environment 100 (FIG. 1) according to various embodiments. Specifically, FIG. 6 depicts a rendered network page 166 generated at least in part by the item search application 121 (FIG. 1) and corresponding to search result network page 125 (FIG. 1).

The search result network page 125 provides search results or recommendations for items 130 (FIG. 1) that are similar to a representative item 130. In this example, the representative item 130 is a shoe having an item title 603 of "Dolzo & Gibbonna Leap Year" and a corresponding item image 606. The representative item 130 may be preselected by the item search application 121 based on previous items 130 ordered or viewed by the user or may be expressly indicated or selected via other rendered network pages 166. A size selection tool 609 may be provided for the user to indicate a preferred item size. Alternatively, or additionally, the item size in the size selection tool 609 may be predetermined by the item search application 121.

A fit selection tool 612 also may be provided for the user to indicate how well the representative item 130 fits. In other words, the fit selection tool 612 permits the user to specify a refinement to the size attribute option that is selected. Radio buttons are provided in order for the user to select one of "somewhat small," "just right," or "somewhat loose." Other options and different user interface components such as, for example, drop-down boxes, checkboxes, etc., may be provided as desired in other embodiments. The refinement option of "somewhat loose" is selected, which indicates that the user wishes to look for items 130 having a smaller size relative to the "EU 39" size option associated with the representative item 130. A search submission component 615 is provided for the user to execute a search for items 130 based on the selected options.

As shown in FIG. 6, a search has already been executed according to the specified parameters, and the representative item 130 and four similar items 130 have been returned by the item search application 121. Search results 618, 621, 624, and 627 are shown in the rendered network page 166. All four corresponding items 130 are women's shoes, and various parameters configured for the item search application 121 may narrow the types of items 130 considered to be similar to the representative item 130. Each of the search results 618, 621, 624, and 627 may include various information about the respective item 130, such as, for example, title, similar size, image, etc., and may include a component for initiating an order of the item 130 with the similar size or viewing a detail network page 125 regarding the item 130.

In this example, none of the search results 618, 621, 624, and 627 are associated with a size option that exactly matches "EU 39." In fact, search result 627 is associated with a size option of "EU 40." Such a discrepancy may be expected when either the representative item 130 or the similar item 130 have a size that differs from the standard scale. Accordingly, the internal representation of the attribute option in the data store 112 (FIG. 1) may have a normalized range of values that is customized for the item 130, the manufacturer of the item, etc. Likewise, although search results 618 and 624 are associated with "US Women's 8.5," search result 621 is associated with "US Women's 8," perhaps for the same reason.

Additionally, the refinement of "somewhat loose" selected in the fit selection tool 612 may impact the sizes or items 130 returned by the item search application 121. For example, because "somewhat loose" is selected, the item search application 121 may return items 130 that have a relatively smaller size according to the normalized scale relative to the selected size for the representative item 130. Furthermore, although only a single attribute of size is employed in the example of FIG. 6, it is understood that a multi-dimensional search may be performed by the item search application 121 based on multiple attributes, which may be specified in part by a representative item 130.

Figure 7:
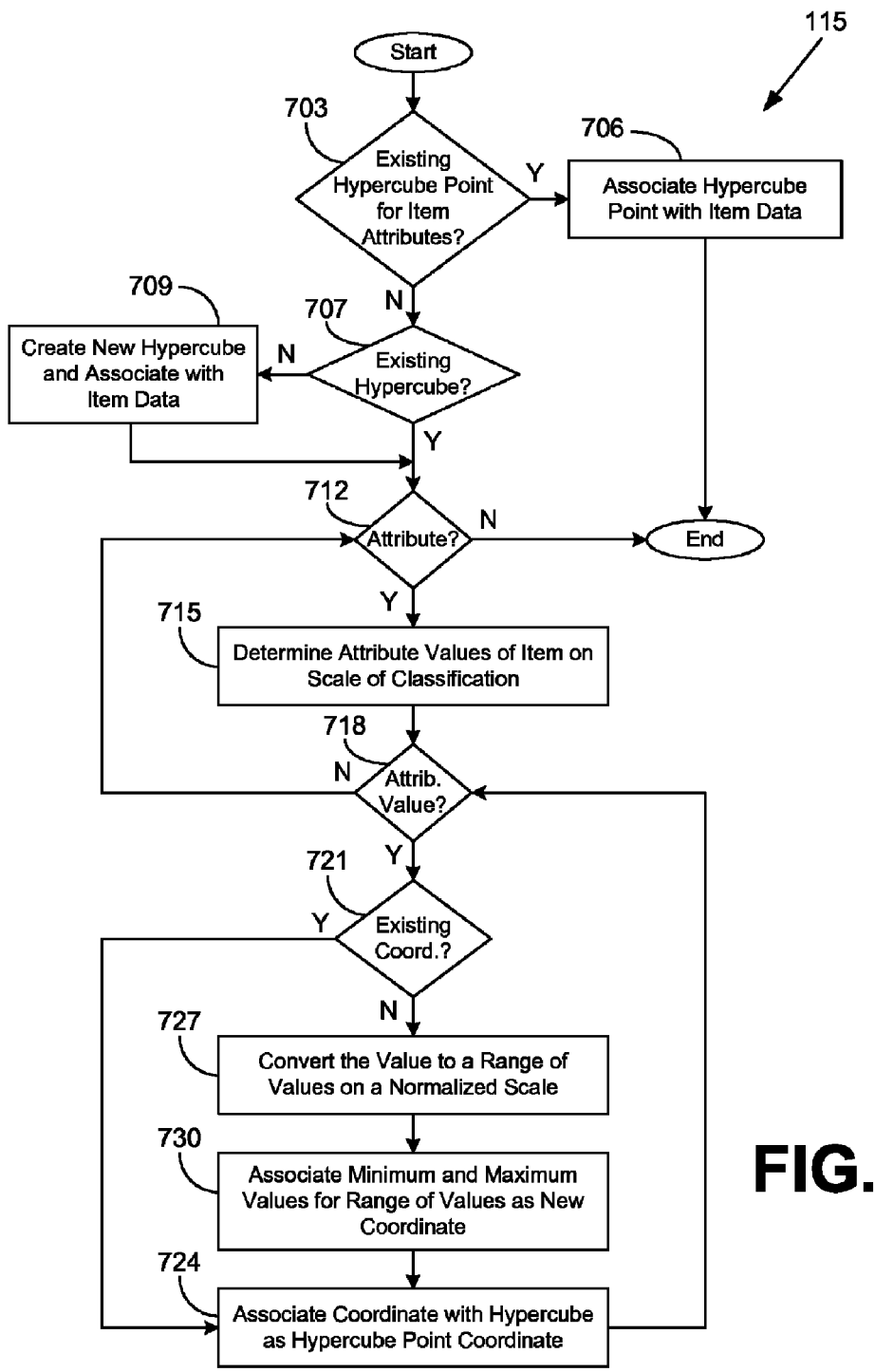
FIG. 7 is a flowchart illustrating one example of functionality implemented as portions of an item attribute normalization application executed in a computing device in the networked environment of FIG. 1 according to various embodiments of the present disclosure.

Referring next to FIG. 7, shown is a flowchart that provides one example of the operation of a portion of the item attribute normalization application 115 according to various embodiments. It is understood that the flowchart of FIG. 7 provides merely an example of the many different types of functional arrangements that may be employed to implement the operation of the portion of the item attribute normalization application 115 as described herein. As an alternative, the flowchart of FIG. 7 may be viewed as depicting an example of steps of a method implemented in the computing device 103 (FIG. 1) according to one or more embodiments.

Beginning with box 703, the item attribute normalization application 115 determines whether the hypercube data 133 (FIG. 1) includes one or more existing hypercube points 139 (FIG. 1) for the attributes of a item 130 (FIG. 1) to be imported or updated. If the item attribute normalization application 115 determines that there is an existing hypercube point 139 corresponding to the attributes of the item 130, the item attribute normalization application 115 moves to box 706 and associates the existing hypercube point 139 with the data relating to the item 130. Thereafter, the portion of the item attribute normalization application 115 ends.

If the item attribute normalization application 115 determines that no existing hypercube point 139 is available, the item attribute normalization application 115 proceeds to box 707 and determines whether there is an existing hypercube 136 (FIG. 1) for the attributes of the item 130. If there is an existing hypercube 136, such a hypercube 136 may be associated with the item 130 and the item attribute normalization application 115 may proceed to box 712. If the item attribute normalization application 115 instead determines that no existing hypercube 136 is suitable, the item attribute normalization application 115 transitions to box 709 and creates a new hypercube 136 and associates the data relating to the item 130 with the hypercube 136. The item attribute normalization application 115 may then proceed to box 712.

In box 712, the item attribute normalization application 115 determines whether an attribute of the item 130 remains to be converted. If no attribute of the item 130 remains to be converted or added to the hypercube 136, the portion of the item attribute normalization application 115 ends. Otherwise, the item attribute normalization application 115 proceeds to box 715.

In box 715, the item attribute normalization application 115 determines the values for the attribute for the item 130 according to a scale of classification or measurement. An axis 151 (FIG. 1) may be created for the attribute if necessary and associated with the hypercube 136 using a hypercube axis 154 (FIG. 1). Next, in box 718, the item attribute normalization application 115 determines whether a value or option for the attribute remains to be processed. If no value or option for the attribute remains to be processed, the item attribute normalization application 115 completes processing of the attribute and returns to box 712. If a value or option for the attribute does remain to be processed, the item attribute normalization application 115 moves to box 721.

In box 721, the item attribute normalization application 115 determines whether the value or option for the attribute corresponds to an existing coordinate 145 (FIG. 1). If so, the item attribute normalization application 115 proceeds to box 724 and associates the existing coordinate 145 with the hypercube 136 as a hypercube point coordinate 142 (FIG. 1). Thereafter, the item attribute normalization application 115 completes processing of the attribute value/option and returns to box 718. If the item attribute normalization application 115 determines in box 721 that the value or option for the attribute does not correspond to an existing coordinate 145, the item attribute normalization application 115 transitions to box 727.

In box 727, the item attribute normalization application 115 converts the value from a unit on a scale of classification natively associated with the item 130 to a range of values on a normalized scale using the attribute scale data 157 (FIG. 1). Next, in box 730, the item attribute normalization application 115 associates minimum and maximum values for the range of values as a new coordinate 145, which may be linked to a coordinate system 148 (FIG. 1) and an axis 151 corresponding to the attribute. The item attribute normalization application 115 moves to box 724 and associates the coordinate 145 with the hypercube 136 as a hypercube point coordinate 142. Thereafter, the item attribute normalization application 115 completes processing of the attribute value/option and returns to box 718.

Figure 8:
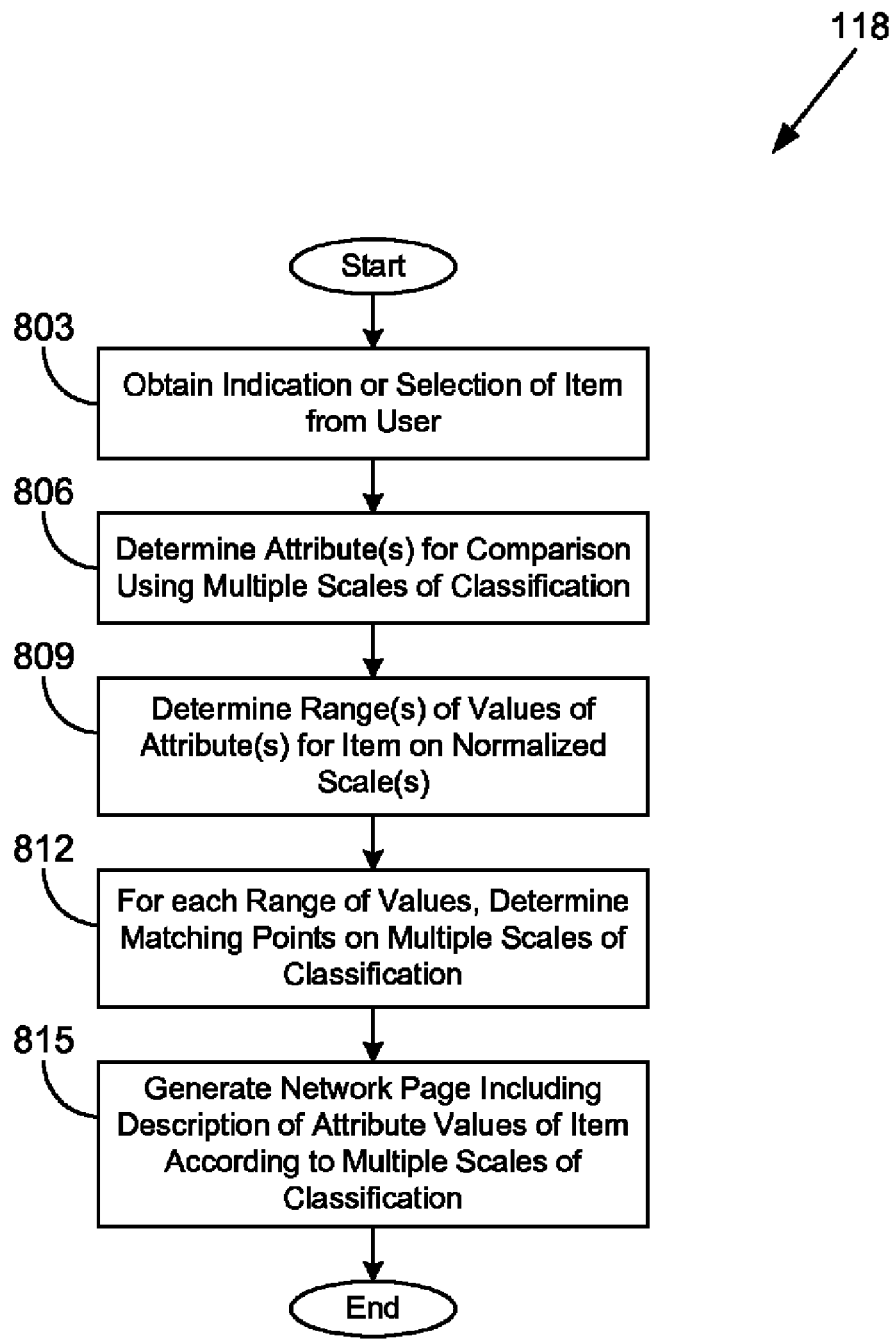
FIG. 8 is a flowchart illustrating one example of functionality implemented as portions of an item classification generation application executed in a computing device in the networked environment of FIG. 1 according to various embodiments of the present disclosure.

Turning now to FIG. 8, shown is a flowchart that provides one example of the operation of a portion of the item classification generation application 118 according to various embodiments. It is understood that the flowchart of FIG. 8 provides merely an example of the many different types of functional arrangements that may be employed to implement the operation of the portion of the item classification generation application 118 as described herein. As an alternative, the flowchart of FIG. 8 may be viewed as depicting an example of steps of a method implemented in the computing device 103 (FIG. 1) according to one or more embodiments.

Beginning with box 803, the item classification generation application 118 obtains an indication or selection of an item 130 (FIG. 1) from a user. As an example, the user at a client 106 (FIG. 1) may request a detail network page 125 (FIG. 1) regarding the item 130 from the electronic commerce application 124. As another example, a network page 125 describing multiple items 130, including the item 130, may be generated in response to a search query from the user.

In box 806, the item classification generation application 118 determines the attribute or attributes of the item 130 for comparison using multiple scales of classification for the respective attribute(s). In box 809, the item classification generation application 118 determines range(s) of values of the attribute(s) for the item 130 on a respective normalized scale. In one embodiment, the item classification generation application 118 may obtain a coordinate 145 (FIG. 1) corresponding to each point 139 (FIG. 1) on a hypercube 136 (FIG. 1).

Next, in box 812, the item classification generation application 118 determines matching points on multiple scales of classification for each range of values. In other words, the item classification generation application 118 may translate the hypercube points 139 to alternate coordinate systems 148 (FIG. 1). Other coordinates 145 may be obtained from the alternate coordinate systems 148 that have respective ranges of values that overlap the range of values for the original coordinates 145 by a threshold or match in some other way.

In box 815, the item classification generation application 118 generates one or more network pages including a description of the attribute values of the item 130 according to multiple scales of classification. The description may be embodied, for example, in a chart, diagram, drop-down box, or other form of data representation. Thereafter, the portion of the item classification generation application 118 ends.

Figure 9:
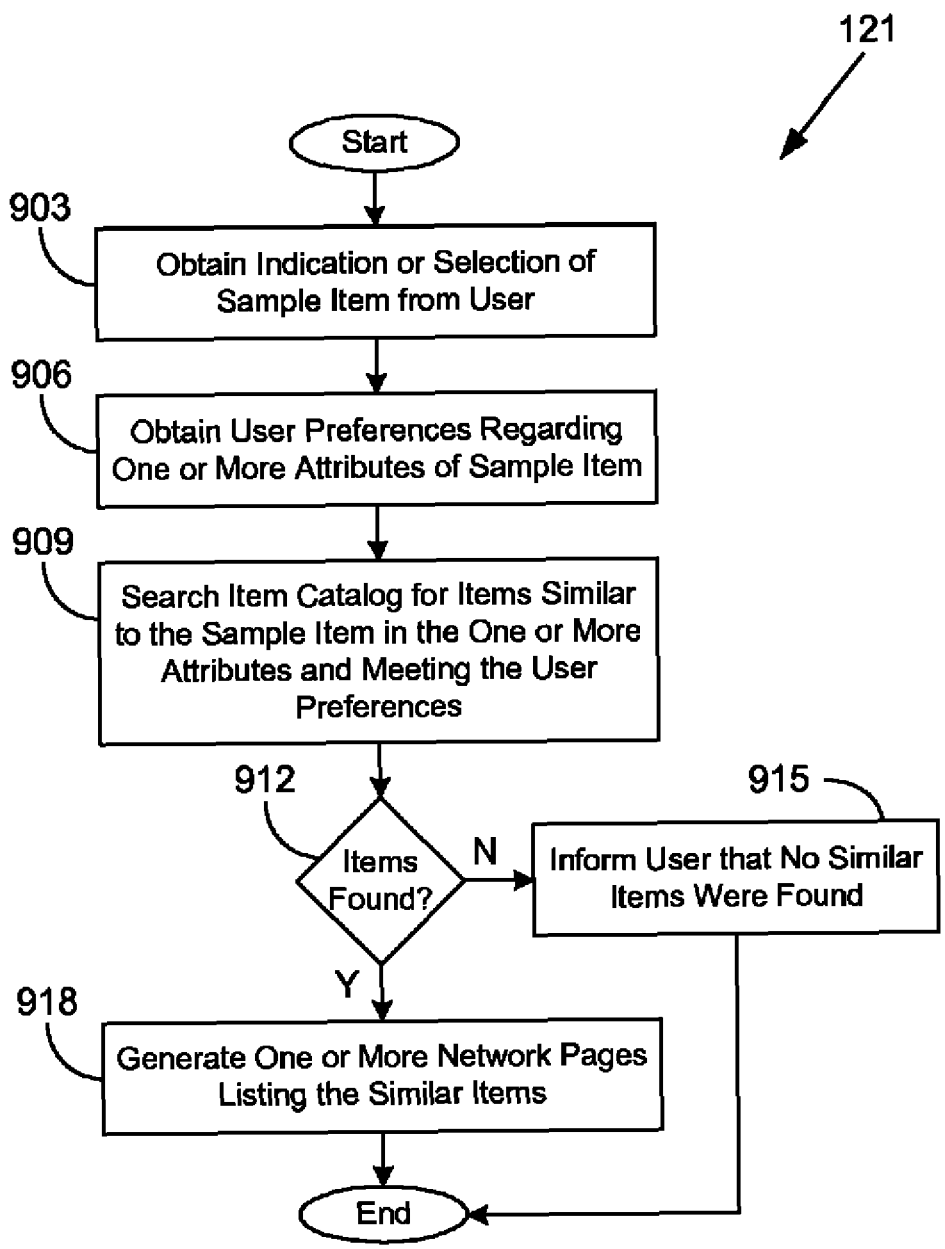
FIG. 9 is a flowchart illustrating one example of functionality implemented as portions of an item search application executed in a computing device in the networked environment of FIG. 1 according to various embodiments of the present disclosure.

Referring next to FIG. 9, shown is a flowchart that provides one example of the operation of a portion of the item search application 121 according to various embodiments. It is understood that the flowchart of FIG. 9 provides merely an example of the many different types of functional arrangements that may be employed to implement the operation of the portion of the item search application 121 as described herein. As an alternative, the flowchart of FIG. 9 may be viewed as depicting an example of steps of a method implemented in the computing device 103 (FIG. 1) according to one or more embodiments.

Beginning with box 903, the item search application 121 obtains an indication or selection of a sample or representative item 130 (FIG. 1) from a user. In some embodiments, the sample item 130 is determined from previous items 130 viewed or purchased by the customer. In some embodiments, multiple sample items 130 may be used in place of a single sample item 130.

In box 906, the item search application 121 obtains user preferences regarding one or more attributes of the sample item 130. For example, the user may specify a preferred value or option for one or more of the attributes. Such preferences may be inferred in some embodiments based on purchase history, page view history, search query history, and or other data associated with the user. Additionally, the user may specify a refinement as to how the selected attribute value or option is interpreted. As a non-limiting example, where the attribute is size, the user may specify that the selected size is rather small, just right, or rather large.

In box 909, the item search application 121 searches a catalog of items 130 for items 130 similar to the sample item(s) 130 in one or more attributes and meeting the user preferences. Additionally, the field of search in the catalog may be controlled in part based on other parameters configured for the item search application 121 and/or specified by the user. The similar items 130 may be identified based in part on the range of values on the normalized scale associated with the selected attribute option for the sample item 130. For example, each similar item 130 may have a respective range of values on the normalized scale that overlaps the range of values of the sample item 130. It may be the case that the different ones of the similar items 130 are associated with different attribute units, different scales of classification, and/or different coordinate systems 148.

In box 912, the item search application 121 determines whether one or more items 130 have been found in the search. If no items 130 are found, the item search application 121 moves to box 915 and informs the user that no similar items 130 were found. Thereafter, the portion of the item search application 121 ends. Otherwise, if similar items 130 are found, the item search application 121 moves to box 918 and generates one or more network pages 125 (FIG. 1) listing the similar items 130. Thereafter, the portion of the item search application 121 ends.

Figure 10:
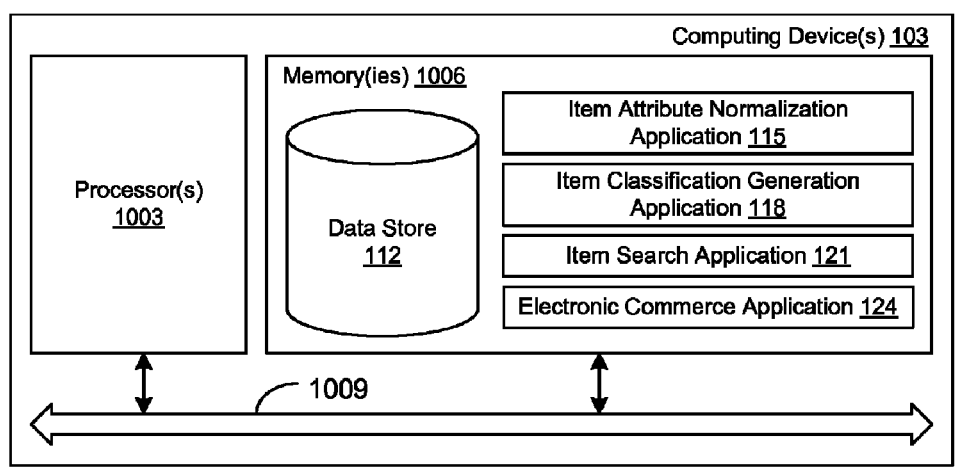
FIG. 10 is a schematic block diagram that provides one example illustration of a computing device employed in the networked environment of FIG. 1 according to various embodiments of the present disclosure.

With reference to FIG. 10, shown is a schematic block diagram of the computing device 103 according to an embodiment of the present disclosure. The computing device 103 includes at least one processor circuit, for example, having a processor 1003 and a memory 1006, both of which are coupled to a local interface 1009. To this end, the computing device 103 may comprise, for example, at least one server computer or like device. The local interface 1009 may comprise, for example, a data bus with an accompanying address/control bus or other bus structure as can be appreciated.

Stored in the memory 1006 are both data and several components that are executable by the processor 1003. In particular, stored in the memory 1006 and executable by the processor 1003 are the item attribute normalization application 115, the item classification generation application 118, the item search application 121, the electronic commerce application 124, and potentially other applications. Also stored in the memory 1006 may be a data store 112 and other data. In addition, an operating system may be stored in the memory 1006 and executable by the processor 1003.

It is understood that there may be other applications that are stored in the memory 1006 and are executable by the processors 1003 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 1006 and are executable by the processor 1003. In this respect, the term "executable" means a program file that is in a form that can ultimately be run by the processor 1003. Examples of executable programs may be, for example, a compiled program that can be translated into machine code in a format that can be loaded into a random access portion of the memory 1006 and run by the processor 1003, source code that may be expressed in proper format such as object code that is capable of being loaded into a random access portion of the memory 1006 and executed by the processor 1003, or source code that may be interpreted by another executable program to generate instructions in a random access portion of the memory 1006 to be executed by the processor 1003, etc. An executable program may be stored in any portion or component of the memory 1006 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1006 is defined herein as including both volatile and nonvolatile memory and data storage components. Volatile components are those that do not retain data values upon loss of power. Nonvolatile components are those that retain data upon a loss of power. Thus, the memory 1006 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1003 may represent multiple processors 1003 and the memory 1006 may represent multiple memories 1006 that operate in parallel processing circuits, respectively. In such a case, the local interface 1009 may be an appropriate network 109 (FIG. 1) that facilitates communication between any two of the multiple processors 1003, between any processor 1003 and any of the memories 1006, or between any two of the memories 1006, etc. The local interface 1009 may comprise additional systems designed to coordinate this communication, including, for example, performing load balancing. The processor 1003 may be of electrical or of some other available construction.

Although the item attribute normalization application 115, the item classification generation application 118, the item search application 121, the electronic commerce application 124, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 7-9 show the functionality and operation of an implementation of portions of the item attribute normalization application 115, the item classification generation application 118, and the item search application 121. If embodied in software, each block may represent a module, segment, or portion of code that comprises program instructions to implement the specified logical function(s).

The program instructions may be embodied in the form of source code that comprises human-readable statements written in a programming language or machine code that comprises numerical instructions recognizable by a suitable execution system such as a processor 1003 in a computer system or other system. The machine code may be converted from the source code, etc. If embodied in hardware, each block may represent a circuit or a number of interconnected circuits to implement the specified logical function(s).

Although the flowcharts of FIGS. 7-9 show a specific order of execution, it is understood that the order of execution may differ from that which is depicted. For example, the order of execution of two or more blocks may be scrambled relative to the order shown. Also, two or more blocks shown in succession in FIGS. 7-9 may be executed concurrently or with partial concurrence. Further, in some embodiments, one or more of the blocks shown in FIGS. 7-9 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the item attribute normalization application 115, the item classification generation application 118, the item search application 121, and the electronic commerce application 124, that comprises software or code can be embodied in any non-transitory computer-readable medium for use by or in connection with an instruction execution system such as, for example, a processor 1003 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:
   code that obtains a request for a network page describing a product;
   code that maintains a set of product attributes associated with the product, wherein each of the product attributes has a respective set of attribute options, each attribute option is associated with a corresponding range of values on a normalized scale for the respective product attribute, a plurality of versions of the product are defined by the attribute options, and each version of the product has a unique stock identifier;
   code that translates a range of values into at least one product classification on each of a plurality of product classification scales associated with a product attribute;
   code that generates at least one chart listing the at one product classification obtained by translating the corresponding range of values for each of at least some of the attribute options, the at least one chart facilitating a comparison of each of the at least some of the attribute options across the respective product classification scales; and
   code that generates the network page including the at least one chart, the network page configured to facilitate a user selection of at least one of the versions of the product according to a selection of at least one of the attribute options.

2. The non-transitory computer-readable medium of claim 1, wherein each of the product attributes corresponds to a measurement of a characteristic associated with the product.

3. The non-transitory computer-readable medium of claim 2, wherein each product classification scale corresponds to a coordinate system denominated in a type of unit of the respective measurement.

4. A system, comprising:
   at least one computing device; and
   an item classification generation application executable in the at least one computing device, the item classification generation application comprising:
      logic that maintains a plurality of attribute options for an item, each of the attribute options for the item being associated with a respective range of values on a normalized scale for an attribute; and
      logic that generates a plurality of item classifications for one of the attribute options by mapping the respective range of values for the one of the attribute options to at least one item classification on each of a plurality of scales of classification for the attribute.

5. The system of claim 4, wherein the item classification generation application further comprises logic that generates a listing of at least one of the attribute options for the attribute corresponding to the scales of classification by generating the respective item classifications for each of the at least one of the attribute options.

6. The system of claim 5, wherein the item classification generation application further comprises logic that generates a network page including a chart setting forth the listing.

7. The system of claim 4, wherein each range of values is maintained as a respective minimum value and a respective maximum value on the normalized scale.

8. The system of claim 4, wherein each of the scales of classification is associated with a respective coordinate system, and the mapping corresponds to a translation of the range of values to the respective coordinate system.

9. The system of claim 8, wherein the translation of the range of values produces one item classification on the respective scale of classification.

10. The system of claim 8, wherein the translation of the range of values produces at least two item classifications on the respective scale of classification.

11. The system of claim 4, wherein each of the attribute options for the item is associated with a respective disjoint set of unique stock identifiers.

12. The system of claim 4, wherein at least one of the scales of classification is specific to a manufacturer of the item.

13. The system of claim 4, wherein at least one of the scales of classification is associated with a geographic area.

14. The system of claim 4, wherein the attribute corresponds to item size, and each of the attribute options corresponds to an available size for the item.

15. The system of claim 14, wherein each of the scales of classification corresponds to a sizing scale, and each of the item classifications corresponds to a size classification for the available size according to the sizing scale.

16. The system of claim 15, wherein the available size is mapped to a plurality of size classifications according to the sizing scale.

17. A method, comprising the steps of:
proving, in at least one computing device, a plurality of attribute options for a product, each of the attribute options corresponding to a respective version of the product that differs with respect to an attribute of the product, each of the attribute options being associated with a respective range of values on a normalized scale for the attribute; and for each of at least one of the attribute options, translating, in the at least one computing device, the respective range of values into at least one product classification on each of a plurality of product classification scales for the attribute.

18. The method of claim 17, further comprising the step of generating, in the at least one computing device, a chart that lists the at least one product classification for each of the product classification scales for each of the at least one of the attribute options.

19. The method of claim 17, further comprising the step of generating, in at least one computing device, a network page including the chart, the network page facilitating a user selection of one of the attribute options for the product.

20. The method of claim 19, wherein the network page is configured to facilitate an initiation of an order for the product having the one of the attribute options according to the user selection.

* * * * *

UNITED STATES PATENT AND TRADEMARK OFFICE
CERTIFICATE OF CORRECTION

| | | |
|---|---|---|
| PATENT NO. | : 8,219,453 B1 | Page 1 of 1 |
| APPLICATION NO. | : 12/856178 | |
| DATED | : July 10, 2012 | |
| INVENTOR(S) | : Iida et al. | |

It is certified that error appears in the above-identified patent and that said Letters Patent is hereby corrected as shown below:

In the Claims

Column 16, lines 19-20, replace "at one product" with --at least one product--

Column 18, line 16, replace "claim 17" with --claim 18--

Column 18, line 17, replace "in at least one" with --in the at least one--

Signed and Sealed this
Eighth Day of July, 2014

Michelle K. Lee
*Deputy Director of the United States Patent and Trademark Office*